United States Patent [19]

Cinotto

[11] Patent Number: 5,406,935
[45] Date of Patent: Apr. 18, 1995

[54] WATER HEATER DRAIN VALVE

[76] Inventor: Gary R. Cinotto, 4107 Briar Ridge Dr., Colleyville, Tex. 76034

[21] Appl. No.: 205,955

[22] Filed: Mar. 3, 1994

[51] Int. Cl.⁶ ............................................. F16K 5/06
[52] U.S. Cl. .................................... 126/360; 251/144
[58] Field of Search ........................ 251/315 SE, 144; 126/344, 361, 373, 374, 380

[56] References Cited

U.S. PATENT DOCUMENTS

| | | | |
|---|---|---|---|
| 1,585,366 | 5/1926 | Birtch | 126/361 X |
| 4,076,211 | 2/1978 | Kredel et al. | 251/286 |
| 4,078,763 | 3/1978 | Yamamoto | 251/286 |
| 4,418,887 | 12/1983 | Tubaro | 251/315 SE X |
| 4,518,149 | 5/1985 | Gardner et al. | 251/144 |
| 5,242,151 | 9/1993 | Boehm et al. | 251/315 R |

Primary Examiner—John C. Fox
Attorney, Agent, or Firm—Arthur F. Zobal

[57] ABSTRACT

A water heater having a drain valve coupled to the water heater tank is provided. The drain valve has an inlet coupled to and communicating with the water heater tank, and an outlet aligned with the inlet along a straight line. A ball valve member having an opening formed therethrough is located between the inlet and outlet. A handle is coupled to the ball valve member for opening and closing the valve. The handle may be rotated rapidly 90 degrees between open and closed positions for opening and closing the valve. In the open position, a straight through path extends through the valve by way of the inlet, ball valve opening, and outlet.

8 Claims, 3 Drawing Sheets

WATER HEATER DRAIN VALVE

BACKGROUND OF THE INVENTION

1. Field of the Invention

The present invention relates to drain valves for water heaters, in particular, a straight through drain valve with rapid action for removing sediment from a water heater and capable of dislodging sediment built up in the valve inlet.

2. Description of the Prior Art

Conventional water heaters used to heat water for home use require routine maintenance to prevent sediment build-up. The sediment is typically the result of rusty or alkaline impurities in the water which enter the tank of the water heater through the water main from which the water heater draws water. Upon entering the water heater tank the sediment settles to the bottom of the tank.

Large accumulations of sediments in the water heater tank may damage the water heater. In electric water heaters sediment may accumulate about the heating element, reducing the efficiency of the water heater and ultimately causing the heating element to burn out. In gas water heaters accumulated sediment greatly increases the noise level of operation of the water heater.

A drain valve is typically provided at the bottom of the heater tank for drawing off accumulated sediments. When sediments have accumulated in the tank, the drain valve may be opened until the sediments have been washed out of the tank.

Conventional water heater drain valves either take a ninety degree turn between the outlet and inlet or require the handle to be rotated 360 degrees several times for full opening. This makes it virtually impossible for large sediments to flow through the valve in that they either get caught at the 90 degree turn or on the threads when the handle is being slowly rotated 360 degrees several times to achieve full opening.

What is needed is a straight-through rapid action valve which is capable of blowing accumulated sediment out of the valve inlet using the pressure of the water in the tank.

SUMMARY OF THE INVENTION

It is therefore, an object of the invention to provide a water heater having a rapid action drain valve structured and arranged for rapid opening and closing of the drain valve so that sediment is ejected from the valve by the pressure in the water heater tank.

It is a further object of the invention to provide a water heater having a straight through drain valve which does not trap sediment therein.

In the embodiment disclosed, the drain valve of the water heater has a straight through opening with full opening being achieved with about a 90 degree turn of the handle. This allows the valve to be rapidly opened and closed to allow pressure surges to be achieved to facilitate removal of the sediments.

DESCRIPTION OF THE PREFERRED EMBODIMENT

Figure 1:
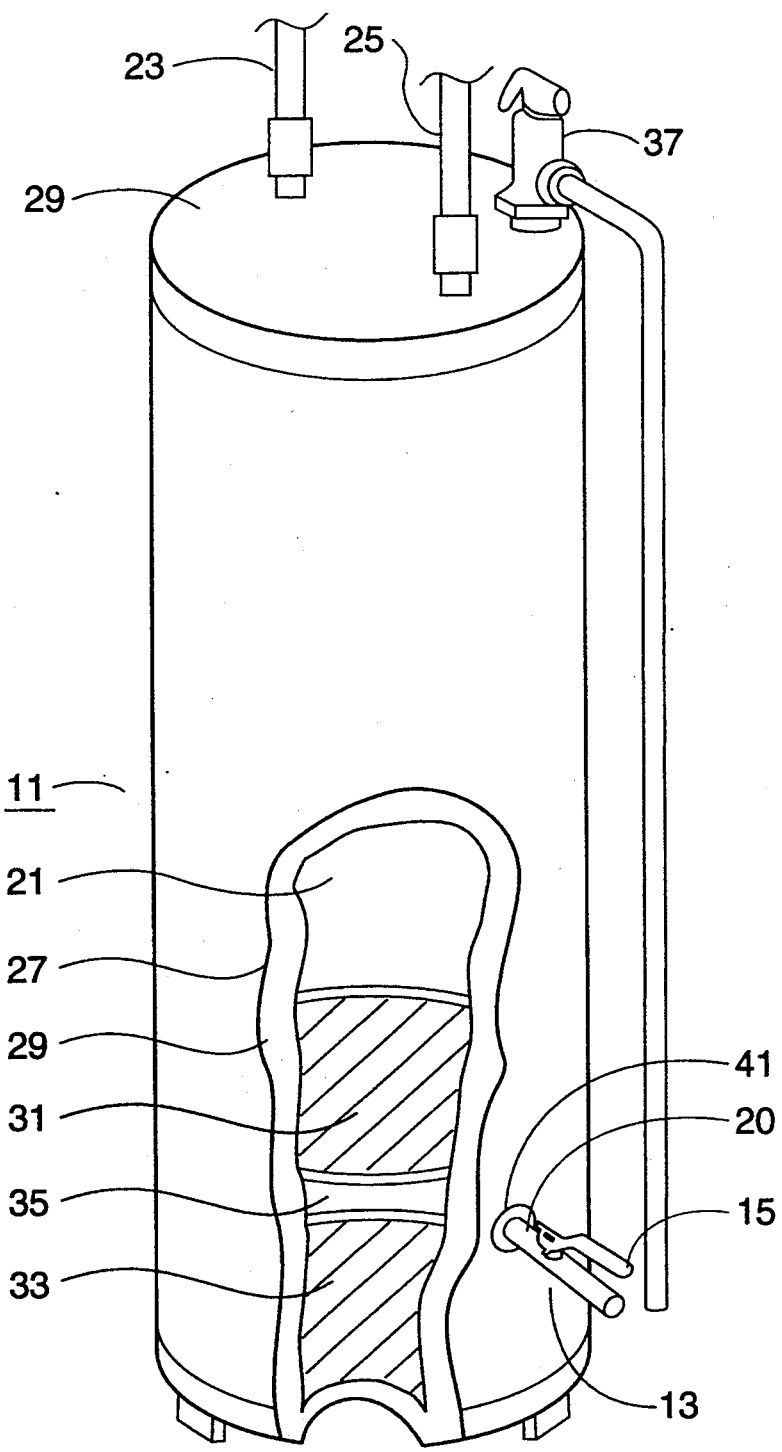
FIG. 1 is a frontal cutaway view of a water heater and the drain valve of the current invention with the drain valve coupled thereto.
Figure 2:
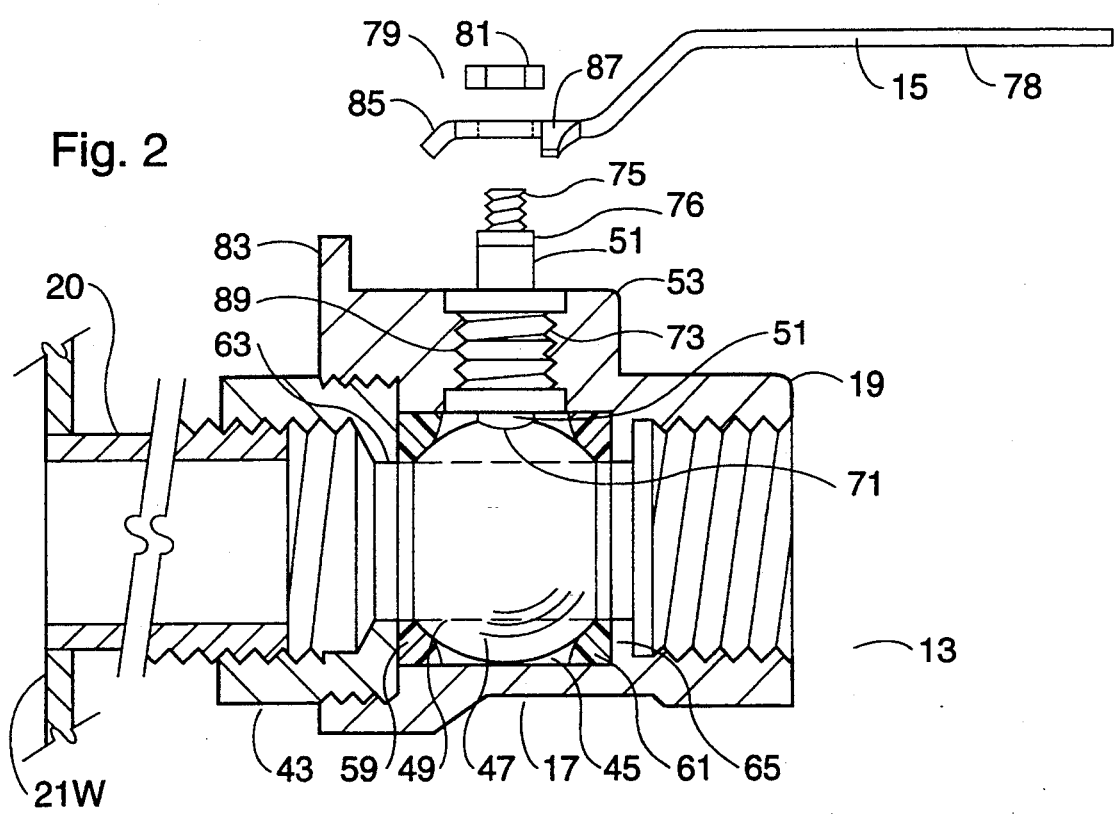
FIG. 2 is a side cutaway view of the drain valve with the drain valve in an open position.
Figure 5:
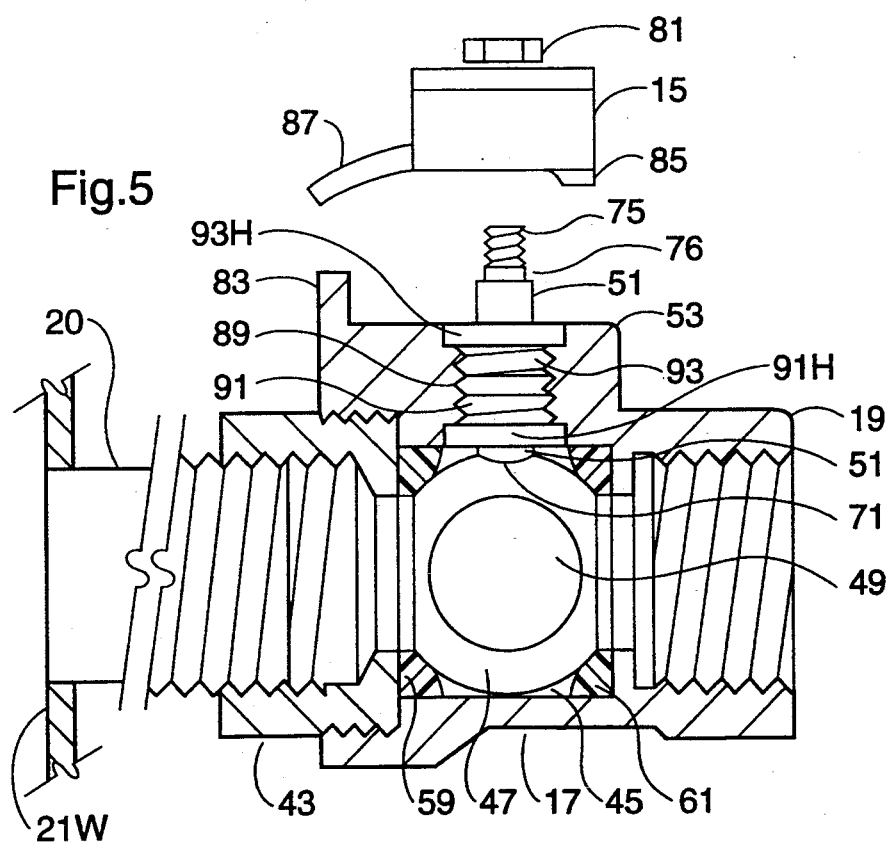
FIG. 5 is a side cutaway view of the valve with the valve member in a closed position.
Figure 4:
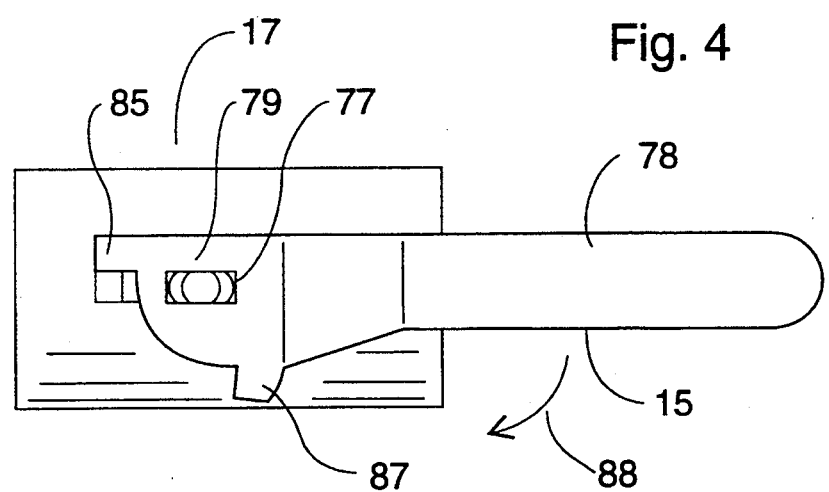
FIG. 4 is a top plan view of the valve with the handle securing nut removed.
Figure 3:
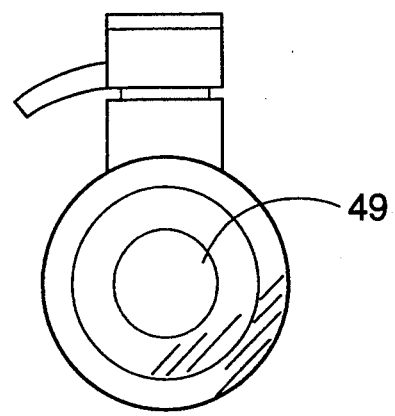
FIG. 3 is an end view of the valve with the valve member in an open position.
Figure 6:
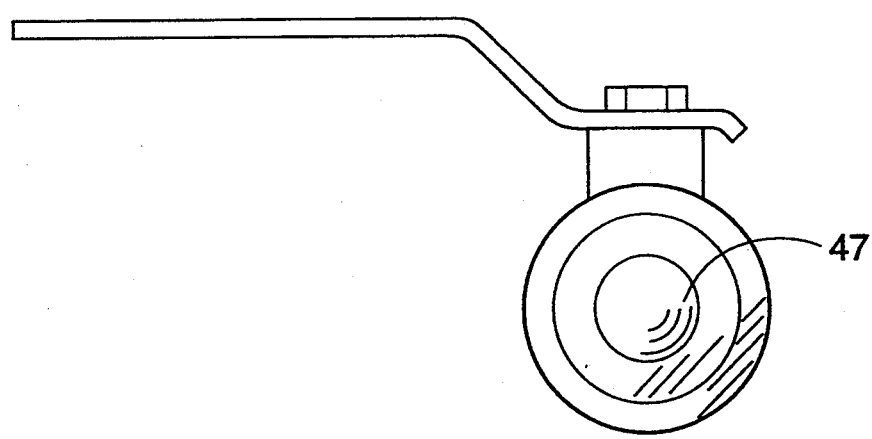
FIG. 6 is an end view of the valve with the valve member in a closed position.

Referring now to FIG. 1, a water heater 11 employing the drain valve 13 of the present invention is shown. The valve 13 is equipped with a rapid action handle 15 which can be rotated between an open position (shown in FIGS. 2 and 3) and a closed position (shown in FIGS. 5 and 6) to open and close the valve 13. The valve 13 is opened to allow sediment accumulated in the water heater 11 to flow out of the water heater 11. The valve 13 is closed to retain water within the water heater 11. The valve 13 may be rapidly opened and closed to dislodge sediment located in the valve with water pressure from the water heater by quickly moving the handle between its open and closed positions. The drain valve 13 has a body 17 which extends straight from the water heater 11 to the outlet 19 of the valve 13 so that no angled joints are located within the valve in which sediment could accumulate which could impede dislocation of sediment through the valve.

The water heater 11 has a tank 21 which may be filled with water through a cold water inlet 23. A heating element (not shown) in the water heater heats the water in the tank 21. Hot water may be removed from the tank through a hot water outlet 25. A jacket 27 extends about the outside of the water heater 11. Insulation 29 separates the water heater tank 21 from the jacket 27 so that water in the tank 21 is less subject to heat loss to the surrounding air. The tank bottom 31 is separated from the bottom 33 of the water heater by a space 35, also to prevent heat loss from water within the tank 21. A pressure relief valve 37 is provided at the top 39 of the water heater 11 to prevent excess pressure from building up within the water heater.

The drain valve 13 is connected to an outlet pipe 20 which extends through the jacket 21 and the insulation 29 and is connected and sealed to the wall 21W of the tank 21 at the bottom of the tank 21 so that water and sediment accumulating on the bottom of the tank 21 may be drained through the pipe 20 and through the drain valve 13. The inlet 43 (shown in FIG. 2) of the valve is screwed to the pipe 20 so that water within the tank 21 may enter the inlet. A seal 41 is located extending about the pipe 20 adjacent the jacket 27.

Referring now to FIGS. 2–6, the drain valve 13 is shown in detail. The drain valve 13 is a split body (end entry) ball valve having a body 17 that encompasses an inlet 43, an outlet 19, and a ball 47. The ball 47 is located within the body 17 between the inlet 43 and the outlet 19. A borehole 49 extends through an axis of the ball 47 so that the valve 13 may be opened and closed by rotatably adjusting the position of the ball 47 with respect to the inlet 43 and the outlet 19. A valve stem 51 extends through the top 53 of the body 17 by way of a threaded hole 73 and is connected to the ball 47. The handle 15 is coupled to the valve stem 51 so that rotation of the handle 15 causes the ball to rotate between a valve open position and a valve closed position.

The valve open and valve closed positions of the valve 13 are determined by the orientation of the hole 49 of the ball 47 relative to the inlet 43 and outlet 19. The inlet 43 and outlet 19 are fixedly disposed at a 180 degree angle with respect to each other about the ball 47 so that water may flow straight through the valve 13 when the valve is open. The borehole 49 of the ball 47 is located extending between the inlet 43 and outlet 19 when the valve 13 is in the valve open position. The inlet 43 and outlet 19 communicate through the borehole 49 creating a flow passage through the inlet 43, borehole 49, and outlet 19. The borehole 49 is located transverse to the inlet 43 and outlet 19 when the valve 13 is in the valve closed position. The ball 47 blocks the flow passage between the inlet 43 and outlet 19 when the borehole 49 is located transverse to the inlet 43 and the outlet 19 prohibiting fluid flow through the valve. The valve open position and the valve closed position of the borehole 49 are separated by a ninety degree rotation of the ball 47.

The body 17 of the valve 13 is constructed of heavy duty metal that is not subject to undue corrosion by water such as bronze, brass, carbon steel, or stainless steel. The body 17 has threads at the inlet 43 and the outlet 19 so that the inlet may be screwed to the outlet pipe 20 and the outlet 19 may be screwed coupled to piping or a hose. As shown in FIGS. 2-6, the threads of the inlet 43 and the outlet 19 are female threads for accepting threaded male coupling members. In another embodiment (not shown), the threads of the inlet 43 outlet 19 may be male threads for connection to threaded female coupling members.

The ball 47 is positioned in a cavity 45 of the body 17 of the valve 13. The ball 47 is rotatably seated within the cavity 45 between an inlet seat 59 and an outlet seat 61. The inlet seat 59 is an O-ring located between the ball 47 and the rim or shoulder 63 of the member inlet 43 and held against the ball by an inlet shoulder 63 of the body 17. The outlet seat 61 is an 0ring located between the ball 47 and the outlet 19 and held against the ball 47 by a rim or shoulder 65 of the body 17.

The inlet seat 59 and the outlet seat 61 retain the ball 47 in place within the valve 13 and provide a seal against the ball 47 while allowing the ball to be freely rotated. The ball 47 is formed of a polished metallic material such as stainless steel, or a hard smooth plastic. The seats 59 and 61 are formed of a resilient elastomeric material such as trifluroethylene (TFE), nylon, or neoprene, which provides a soft, fluid impervious seal against the outer surface of the ball 47.

The valve stem 51 is firedly connected to the ball 47 so that rotation of the valve stem 51 outside the body 17 of the valve 13 causes the ball to rotate between the seats 59 and 61. In a preferred embodiment, the ball end 67 of the valve stem fits into a slot 71 at the top of the ball and may be secured thereto by swagging and/or a friction fit. The valve stem 51 extends out of the top 53 of the body 17 of the valve through the stem aperture 73. A threaded handle end comprising a portion 76 with flattened sides and a portion with a threaded end 75 is located outside of the body 17 of the valve.

The handle 15 is located about the handle end 75 of the valve stem 51 so that the valve stem may be rotated by rotation of the handle. The handle 15 has valve stem end 79 which is coupled to the valve stem 51, and an elongated handle portion 78 which is bent away from the body 17 of the valve for ease of operation. The handle 15 has an elongated valve stem aperture 77 in the valve stem end 79 of the handle. The handle end 75 of the valve stem 51 extends through the valve stem aperture 77 in the handle 15. The handle 15 is secured to the valve stem 51 about the valve stem aperture 77 with a retaining nut 81. The retaining nut 81 is threadably coupled to the threaded handle end 75 of the valve stem 51, and is tightened against the handle 15 to secure the handle to the valve stem. Rotation of the secured handle 15 about the valve stem 51 causes the valve stem and the ball 47 to rotate correspondingly.

A handle stop 83 and handle prongs 85 and 87 aid in orienting the handle 15 so that the valve 13 is located in the valve open position or in the valve closed position. The handle stop 83 is integrally coupled to and extends from the body 17 of the valve. The handle prongs 85 and 87 are integrally coupled to and extend from the valve stem end 79 of the handle 15 at right angles with respect to each other. The handle stop 83 is located between the handle prongs 85 and 87. The handle stop 83 interacts with the handle prongs 85 and 87 to limit the rotation of the handle between the valve open position and the valve closed position. Handle prong 85 abuts the handle stop 83 when the valve is in the valve open position with the valve hole 49 extending between the inlet 43 and outlet 19 of the valve. The handle 15 may be rotated ninety degrees in the direction shown by the arrow 88 to the valve closed position with the valve hole 49 located transverse to the inlet 43 and the outlet 19, at which point the handle prong 87 abuts the handle stop 83 and prevents further rotation of the handle 15. The valve 13 may be rapidly opened and closed by quickly rotating the handle between the valve open position and the valve closed position.

A stem seal 89 located between lower and upper annular bushings 91 and 93 with heads 91H and 93H with outer threads prevent potential leakage through the stem aperture 73 of the body 17. The bushings 91 and 93 have heads 91H and 93. The stem seal 89 is located centrally within the stem aperture 73 extending about the valve stem 51. The stem seal 89 is formed with resilient elastomeric packing material or an O-ring made of resilient elastomeric material. The stem seal 89 is located between the upper and lower ends of the bushings 91 and 93. The lower bushing 91 is screwed into the stem aperture 73 about the valve stem 51 adjacent the cavity 45 in the valve body 17. The upper bushing is threadably coupled to the stem aperture 73 about the valve stem 51 with its head 91H located above the top 53 of the valve body 15. The stem seal 89 is compressed between the upper and lower ends of the bushings 91 and 93 to seal the stem aperture 73.

Referring back to FIG. 1, operation of the rapid action, straight through drain valve 13 to remove sediment from the water heater will now be described. The valve 13 is normally located in its valve closed position with handle prong 87 located against the handle stop 83 so that water is retained within the water heater tank 31. When sediment is to be removed from the water heater tank 31, the handle 15 is rotated from its valve closed position until the handle prong 85 is located against the handle stop 83 thereby locating the valve in its valve open position. Means for collecting the sediment containing water will be connected to or located under the outlet 19 of the valve. Water is drained through the open valve until the sediments are removed from the tank 31, as evidenced by the water changing from cloudy to clear. The valve is then closed by relocating the handle prong 87 against the handle stop 83.

If sediments have accumulated so that little or no water flows through the valve 13 when the handle 15 initially is located in the valve open position, the sediments may be dislodged by rapidly opening and closing the valve 13. The valve 13 is rapidly opened and closed by quickly moving the handle 15 back and forth so that he handle prongs 85 and 87 alternately abut the handle stop 83. The water pressure in the tank 21 in conjunction with the rapidly opened and closed valve causes pressure surges which cause the sediment in the valve to become dislodged. After the sediment is dislodged, the water is drained until the sediments are removed from the tank 31. The valve is then located in its valve closed position.

As an alternative, with the valve 15 in its open position, a wire may be inserted through the open valve to dislodge and break up the sediments.

In one embodiment the valve opening 49 through the ball 47 has a diameter of about 9/16 of an inch although other sized of valves may be used.

The foregoing disclosure and the showings made in the drawings are merely illustrative of the principles of this invention and are not to be interpreted in a limiting sense.

I claim:

1. A water heater apparatus, comprising:

a water heater having a tank therein for holding water, a drain valve having an inlet coupled to said tank and communicating with said tank, said drain valve having an outlet aligned with said inlet along a straight line, said drain valve having a valve member with an opening extending therethrough, a handle coupled to said valve member for rotating said valve member about 90 degrees between open and closed positions for opening and closing said valve, and in said open position a straight line flow path extends straight through said valve by way of said inlet, and said valve member opening and said outlet.

2. The water heat apparatus of claim 1, wherein:

said valve member is formed by a spherical ball having said opening extending through an axis of said ball, where said inlet and said outlet communicate through said opening when said valve member is in said open position.

3. The water heater apparatus of claim 2, wherein:

said handle may rotate said ball valve member rapidly between said open and closed positions.

4. The water heater apparatus of claim 1, wherein:

said handle may rotate said valve member rapidly between said open and closed positions.

5. A water heater apparatus, comprising:

a water heater having a tank therein for holding water;

an outlet tube extending from the lower end of said tank and communicating with the interior of said tank;

said outlet tube having an outlet end with coupling threads;

a drain valve having an inlet with threads screwed to said threads of said outlet end of said tube;

said drain valve having an outlet aligned with said inlet along a straight line;

said outlet of said drain valve having threads to allow a threaded tubular member to be screwed thereto;

said drain member having a valve member with an opening extending therethrough;

a handle coupled to said valve member for rotating said valve member about 90 degrees between open and closed positions for opening and closing said valve, and in said open position a straight line flow path extends straight through said valve by way of said inlet, said valve member opening and said outlet of said valve.

6. The water heater apparatus of claim 5, wherein:

said valve member is formed by a spherical ball having said opening extending through an axis of said ball, where said inlet and said outlet communicate through said opening when said valve member is in said open position.

7. The water heater apparatus of claim 6, wherein:

said handle may rotate said ball valve member rapidly between said open and closed positions.

8. The water heater apparatus of claim 5, wherein:

said handle may rotate said valve member rapidly between said open and closed positions.

* * * * *